United States Patent [19]

Urban et al.

[11] 4,237,104

[45] Dec. 2, 1980

[54] FLUE GAS TREATMENT FOR SULFUR DIOXIDE REMOVAL

[75] Inventors: Peter Urban, Northbrook, Ill.; John C. Stauter, Edmond, Okla.; William K. Tolley, Arlington Heights, Ill.

[73] Assignee: UOP Inc., Des Plaines, Ill.

[21] Appl. No.: 34,806

[22] Filed: Apr. 30, 1979

[51] Int. Cl.$^3$ .............................................. C01B 17/00
[52] U.S. Cl. ..................................... 423/242; 423/118; 423/326
[58] Field of Search .................... 423/242 A, 326, 118, 423/242 R

[56] References Cited

U.S. PATENT DOCUMENTS

| | | | |
|---|---|---|---|
| 2,088,281 | 7/1937 | Smith | 423/326 |
| 3,622,443 | 11/1971 | Galeano | 423/242 |
| 3,653,812 | 4/1972 | Schneider et al. | 423/242 |
| 3,971,844 | 7/1976 | Schneider | 423/242 |
| 3,989,797 | 11/1976 | Brady et al. | 423/242 |

*Primary Examiner*—O. R. Vertiz
*Assistant Examiner*—Gregory A. Heller
*Attorney, Agent, or Firm*—James R. Hoatson, Jr.; Louis A. Morris; William H. Page, II

[57] ABSTRACT

A process for removing, by absorption, sulfur dioxide from a gaseous mixture such as a flue gas by scrubbing said mixture with an aqueous scrubbing liquor to which a solution of an alkaline reagent such as sodium carbonate is added to maintain alkalinity of the scrubbing liquor. The solution also has dissolved in it a quantity of silica which tends to precipitate when solution is added to the scrubbing liquor. The silica precipitated in this manner tends to form extremely hard solid deposits in the scrubbing device and associated equipment. If a water soluble acid salt such as ferrous or ferric sulfate is added to the alkaline reagent solution prior to its use in the process, the precipitate formed has a minimum deleterious effect.

7 Claims, No Drawings

FLUE GAS TREATMENT FOR SULFUR DIOXIDE REMOVAL

BACKGROUND OF THE INVENTION

1. Field of the Invention

The field of art to which the claimed invention pertains is liquid-gas absorptive separations. More specifically, the claimed invention relates to a process for the absorptive removal of sulfur dioxide from a gaseous mixture by means of a scrubbing liquor.

DESCRIPTION OF THE PRIOR ART

Due to the ever increasing concern about air pollution, great efforts have been expended in recent years toward the development of processes to reduce the pollutants introduced into the atmosphere from various industrial operations. One of the most onerous of these pollutants is sulfur dioxide which is present in the stacks or flue gases from various operations. For example $SO_2$ is a primary pollutant released into the atmosphere in the production of sulfuric acid. Also, great quantities of $SO_2$ are produced and passed to the atmosphere in the generating of power, particularly where the fuel used is high in sulfur content.

It has long been known to the art how to abate sulfur dioxide pollution of the atmosphere. The so-called "wet process" is probably the most commonly used process to accomplish such abatement. In the wet process the $SO_2$ containing gas mixture is contacted or "scrubbed" with water in which is dissolved or slurried a reagent, particularly an alkaline reagent, that chemically reacts with the $SO_2$, thus effecting the removal of the $SO_2$ from the gas mixture and incorporating the sulfur originally contained in the $SO_2$ into a non-volatile compound dissolved in the scrubbing water. The sulfur is ultimately removed from the system by the discarding of the scrubbing water in which it is contained, or by removal from the water by further processing.

The alkaline reagent perhaps best known to the art for use in the scrubbing solution for the above wet process is alkali metal carbonate or bicarbonate. The alkali metal carbonate or bicarbonate reacts with the $SO_2$ to yield alkali metal sulfite or bisulfite and $CO_2$. Use of the alkali metal carbonate and specifically sodium carbonate or bicarbonate is particularly advantageous because solutions of that compound are commonly available as an abundant minerl deposit (Trona) occurring in the western part of the United States, and as process-waste streams from industries such as metals production, textiles and paper making. The use of such streams not only cuts operating costs but also permits economies in the capital costs of wet processes because it eliminates the need for equipment to store and mix reagents obtained from other sources. Examples of prior art wet $SO_2$ scrubbing processes which utilize alkali metal carbonates are taught or claimed in U.S. Pat. Nos. 3,962,410; 3,963,825; 3,972,980; 3,984,529; and 3,987,147.

We have observed that certain inexpensive sources of sodium carbonate or bicarbonate (soda liquor), such as that produced as a by-product from the production of commercial grade sodium carbonate, contain quantities of silica which, when the soda liquor is used in the wet scrubbing process, precipitate and form deposits on the internals of the scrubbing apparatus. These deposits, which are extremely hard solids interfere with the operation of the apparatus by eventually plugging the pipes and liquid circulating means which are a part of the apparatus. There is no practical way of removing these deposits.

We have found a means of minimizing the deleterious effects of the presence of silica in the alkali reagent used in the wet $SO_2$ scrubbing process.

SUMMARY OF THE INVENTION

It is, accordingly, a broad objective of our invention to provide an improvement to a process for the absorptive removal of sulfur dioxide from a gaseous mixture by minimizing the deleterious effects of silica present in the scrubbing liquor used in the process.

In brief summary, our invention is a process for the absorptive removal of sulfur dioxide from a gaseous mixture by contacting the gaseous mixture in a scrubbing zone with a scrubbing liquor which comprises a buffered solution of an alkali metal sulfite and bisulfite. The alkalinity of the scrubbing liquor is maintained by adding to it an aqueous alkaline reagent solution having a relatively high pH with respect to the scrubbing liquor. The aqueous alkaline reagent solution has dissolved in it an undesirable quantity of silica contaminant which, upon the addition of the aqueous alkaline reagent solution to the scrubbing liquor tends to precipitate from solution and form deleterious deposits. These deposits interfere with the functioning of the process. The improvement to the process comprises the addition of a water soluble acid salt of a metal selected from the group consisting of iron, cobalt, nickel, copper and aluminum to the aqueous alkaline reagent solution prior to the addition of the aqueous alkaline reagent solution to the scrubbing liquor. This effects a chemical reaction between the silica and acid salt to obtain a silicon containing material having a minimum deleterious effect when precipitated and relatively minor interference with the functioning of the process.

Other objectives and embodiments of our invention encompass details about feed mixtures, scrubbing liquors, and operating conditions, all of which are hereinafter disclosed in the following discussion of each of the facets of the present invention.

DESCRIPTION OF THE INVENTION

Sulfur dioxide contained in a gaseous mixture, such as a flue gas, may be removed from the gas in a scrubber by means of an aqueous alkaline reagent solution. The alkaline reagent used in the process of our invention is preferably alkali metal carbonate and bicarbonate and most preferably sodium carbonate and bicarbonate. The overall reaction that occurs when the sodium carbonate or bicarbonate is used is:

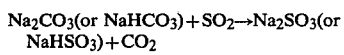

The $Na_2SO_3$ and $NaHSO_3$ are non-volatile and highly water soluble, thereby effectively precluding the possibility of reintroduction of the sulfur into the gaseous mixture in any form.

The typical inexpensive soda liquor source comprises a waste stream or by-product of a wide variety of industrial processes, such as the process for the mining of soda ash. These sources, particularly if obtained from the process for the mining of soda ash, frequently contain an undesirable quantity of silica as a contaminant. The silica will be present in the high pH soda liquor in the form of water soluble sodium silicate having the formula $Na_2O \times SiO_2$, where x may be from 2 to 5. Silicate ions in a high pH aqueous solution tend to form polysilicic acid which comprises a molecular chain having up to four silicon atoms with an SiOH group on one or both ends of the chain.

The soda liquor obtained from the process for the mining of soda ash will contain about 30 wt. % sodium carbonate and about 1 wt. % slica calculated on the basis of silicon dioxide. The pH of this liquor will be about 11.5.

The typical flue gas scrubbing device comprises a vertically elongated chamber with means for introduction of the scrubbing liquor into the upper portion of the chamber and means for introduction of the flue gas into the lower portion. The liquor will be sprayed into the chamber and will flow downward through the chamber thereby coming into intimate contact with the up-flowing flue gas and thus enabling the absorption of the $SO_2$ from the flue gas into the liquor. The liquor drains out of the bottom of the chamber and is recirculated via pump and piping for reintroduction into the top portion of the chamber. A certain amount of the circulating liquor will be removed from the system and an amount of fresh alkaline reagent solution will be added to maintain the necessary alkalinity of the liquor.

The circulating scrubbing liquor will comprise a buffered solution of alkali metal sulfite and bisulfite having a pH from about 7.0 to about 8.0. The alkaline reagent solution which has a relatively high pH with respect to the scrubbing liquor, is added to the scrubbing liquor to maintain the pH of the scrubbing solution in the above range. The silica contained in the alkaline reagent solution will precipitate upon such addition due to insolubility of the silica in the scrubbing liquor at the relatively low pH of the scrubbing liquor. It is this precipitate which forms the aforementioned deleterious deposits on the internals of the scrubber and in the piping and associated equipment servicing the scrubber.

We have found that when a water soluble acid salt of a metal selected from the group consisting of iron, cobalt, nickel, copper and aluminum, is added to a silica containing alkaline reagent solution prior to the solution being added to the scrubbing liquor, $SiO_2$ will not be precipitated in the scrubbing liquor and the deleterious deposits will not be formed. Instead, a gelatinous silica containing material is precipitated in the alkaline reagent solution which, when compared to $SiO_2$, is almost completely innocuous. This gelatinous material need not be removed from the alkaline reagent solution prior to the addition of the solution to the scrubbing liquor. This gelatinous material does not tend to form deposits, but largely remains in a colloidal suspension that has no effect on the scrubbing operation. The small amount of precipitate that is deposited adheres very loosely and is easily flushed from the system.

The terms "acid salt" and "basic salt" shall mean a water soluble mineral salt which, when dissolved in water, causes the solution formed to have a pH less than 7.0 in the case of an acid salt and a pH greater than 7.0 in the case of a basic salt.

The mole ratio of the silica contained in the scrubbing liquor to the metal contained in the acid salt may be considerably greater than 1.0. This is because of the aforementioned formation of polysilicic acid, each molecule of which could contain up to four silicon atoms, but which has a maximum of only two reactive groups (SiOH). Thus, no more than two acid salt metallic ions will react with each molecule of polysilicic acid regardless of how many silicon atoms are in the molecule. We have found the present invention effective up to a silica to acid salt metal mole ratio of about 4.0:1.0.

It is essential that the salt added to the alkaline reagent solution be an acid salt. It has been observed that when a basic salt, such as sodium aluminate, is used, the situation frequently arises that the mole ratio of the silica contained in the alkaline reagent solution to the metal contained in the acid salt may not exceed 1.0:1.0, if the problem of deleterious deposits is to be avoided. It has been further observed that this situation is particularly likely to occur when the sodium aluminate used contains sodium hydroxide (caustic) as an impurity, which often cannot be avoided since the least expensive source of sodium aluminate and thus the source most likely to contain caustic, must be utilized for the process to be economically feasible. The reason formulated for such an effect of the use of a basic salt is that caustic mixed with the salt and perhaps the salt itself when dissolved in the alkaline reagent solution inhibits or precludes the aforementioned formation of polysilicic acid, and, thus, the previously discussed advantage of no more than two acid salt metallic ions being needed to react with polymeric molecules containing up to four atoms of silicon is not realized.

Acid salts and particularly sulfates of either aluminum or iron are preferred for use in this invention because of their effectiveness, availability and low cost. The iron salts, however, both in the ferrous and ferric form, are particularly preferred because of the ease by which they are introduced into the alkaline reagent solution. In all cases this invention contemplates the addition of the acid salt, to the alkaline reagent solution, dissolved in an aqueous solution. An aqueous solution of an acid salt of aluminum needs to be added into a mixing area of high shear, such as the nozzle area of an homogenizer, because of the tendency of the aluminum salt to polymerize upon alkalation. The acid salts of iron do not have as great a tendency to polymerize in solution and therefore do not require as high an input of mixing energy.

The example shown below is intended to further illustrate the process of this invention and is not to be construed as unduly limiting the scope and spirit of said process.

EXAMPLE

This example presents the results of the practice of the present invention on a laboratory scale $SO_2$ scrubber.

The scrubber vessel comprised a 1000 ml glass flask with a bottom drain fitting. Scrubbing liquor passed through the drain fitting and flowed into tubing connecting the drain fitting to the inlet of a ¼ HP glanless magnetic centrifugal pump. The pump recirculated the liquor via tubing through a stopper in the neck of the flask with the liquor being discharged downward in the neck of the flask. Between the pump discharge and the flask were provisions for external heating of the tubing and withdrawal of circulating liquor. Fresh soda liquor, either treated or untreated with acid salt in accordance with this invention, was metered through a rotameter and pumped into the system at a point in the tubing between the flask and the inlet of the circulating pump, and a like quantity of circulating liquor was removed via the above-mentioned withdrawal provision.

The $SO_2$ and air were each metered through rotameters and blended into a tube which passed through the stopper in the flask and extended down into the flask to discharge through a sparger near the bottom of the flask. The gaseous mixture would thus flow upward through the flask and come into contact with the scrubbing liquor flowing downwardly through the flask. The portion of the gaseous mixture not absorbed was vented out of the flask through an opening in the stopper. All tubing used in the scrubber system was 10 mm ID glass.

To obtain experimental data, four alkaline reagent solutions were prepared. The first was the control sample and comprised a soda liquor comprising an aqueous solution of 30 wt. % sodium carbonate and 4100 parts per million by weight (ppm), calculated on the basis of elemental silicon, of silica diluted with sufficient quantity of water to obtain a silicon concentration of 3200 ppm. The other three alkaline reagent solutions were the same as the first, except different amounts of aqueous solutions of precipitating agents were added to each to obtain second, third and fourth sample alkaline reagent solutions having a silicon concentration of 3200 ppm and characterized as follows:

| Sample No. | Precipitating Agent | Silica to Precipitating Agent Metal Ion (Me) Mole Ratio |
|---|---|---|
| 2 | $Al_2(SO_4)_3$ | 2.0:1.0 |
| 3 | $FeSO_4$ | 1.5:1.0 |
| 4 | $FeSO_4$ | 4.0:1.0 |

Four test runs were made on the above scrubber system, each of which utilized a different one of the above sample alkaline reagent solutions. The operating conditions of the scrubber system during all of the test runs was as follows:
$SO_2$ rate—0.27 cubic ft./hr.
Air rate—0.5 to 1 cubic ft./hr.
Recirculating scrubbing liquor temperature—53±3° C.
Velocity of recirculating scrubbing liquor in tubing—2 to 3 ft./sec.
Following are the results of the test runs:

| Run & Sample No. | Ph Range | Observations |
|---|---|---|
| 1 | 7.4 to 7.6 | Hard unremovable, stone like deposits in scrubber system. |
| 2 | 7.2 to 7.6 | Clean tubes with loose gelatinous circulating material. |
| 3 | 7.5 to 7.8 | Clean tubes with loose gelatinous circulating material. |
| 4 | 7.6 to 7.7 | Gelatinous deposits removal with moderate force of circulating water. |

The advantages of the present invention are readily apparent from the above data. Without pre-treatment with a precipitating agent the use of silica-containing alkaline reagent solution results in a buildup of hard deposits in the system that would eventually render it inoperative. The gelatinous precipitate formed by the addition of the precipitating agent is innocuous up to an estimated Si to Me mole ratio of about 4.0:1.0. Above that value the precipitate would tend to become too firmly deposited in the scrubber system to be removed by practical means, such as flushing with water.

We claim as our invention:

1. In a process for the absorptive removal of sulfur dioxide from a gaseous mixture by contacting said gaseous mixture in a scrubbing zone with a scrubbing liquor comprising a buffered solution of an alkali metal sulfite and bisulfite, the alkalinity of said scrubbing liquor being maintained by the addition thereto of an aqueous alkaline reagent solution comprising sodium carbonate or sodium bicarbonate having a relatively high pH with respect to said scrubbing liquor, said aqueous alkaline reagent solution having dissolved therein an undesirable quantity of silica contaminant which, upon the addition of said aqueous alkaline reagent solution to said scrubbing liquor tends to precipitate from solution and form deleterious deposits which interfere with the functioning of said process, the improvement which comprises the addition of a water soluble acid salt of a metal selected from the group consisting of iron, cobalt, nickel, copper and aluminum to said aqueous alkaline reagent solution prior to the addition of said aqueous alkaline reagent solution to said scrubbing liquor thereby effecting a chemical reaction between said silica and said acid salt to obtain a silicon containing material having a minimum deleterious effect when precipitated and relatively minor interference with the functioning of said process.

2. The process of claim 1 further characterized in that said gaseous mixture comprises a flue gas.

3. The process of claim 1 further characterized in that said aqueous alkaline reagent solution comprises an aqueous solution having a pH of about 11.5 and containing about 30 wt. % sodium carbonate and about 1 wt. % silica calculated on the basis of silicon dioxide.

4. The process of claim 3 further characterized in that the pH of said scrubbing liquor ranges from about 7.0 to about 8.0 during said contacting with said gaseous mixture.

5. The process of claim 1 further characterized in that said acid salt comprises aluminum sulfate.

6. The process of claim 1 further characterized in that said acid salt comprises ferrous or ferric sulfate.

7. The process of claim 1 further characterized in that the quantity of said acid salt added to said alkaline reagent solution is such that the mole ratio of silica contained in said alkaline reagent solution to said metal contained in said added acid salt is from about 4.0:1.0 to about 1.0:1.0.

* * * * *